US008488957B2

(12) United States Patent
Chiu et al.

(10) Patent No.: US 8,488,957 B2
(45) Date of Patent: Jul. 16, 2013

(54) ACTUATOR AND CAMERA MODULE HAVING SAME

(75) Inventors: Chi-Wei Chiu, Tu-Cheng (TW); Sung-Ching Wu, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 104 days.

(21) Appl. No.: 13/095,879

(22) Filed: Apr. 28, 2011

(65) Prior Publication Data

US 2012/0148223 A1 Jun. 14, 2012

(30) Foreign Application Priority Data

Dec. 9, 2010 (TW) .............................. 99142910 A

(51) Int. Cl.
*G03B 13/34* (2006.01)
(52) U.S. Cl.
USPC .......................................................... 396/133
(58) Field of Classification Search
USPC .......................................................... 396/133
See application file for complete search history.

(56) References Cited

U.S. PATENT DOCUMENTS

| 8,274,747 | B2* | 9/2012 | Wu et al. ....................... 359/824 |
| 2006/0056829 | A1* | 3/2006 | Hirota et al. ..................... 396/54 |
| 2008/0192363 | A1* | 8/2008 | Shirono et al. ................. 359/698 |
| 2010/0021150 | A1* | 1/2010 | Maeda et al. ................... 396/55 |
| 2012/0140345 | A1* | 6/2012 | Chiu .............................. 359/824 |

* cited by examiner

*Primary Examiner* — Clayton E Laballe
*Assistant Examiner* — Dennis Hancock
(74) *Attorney, Agent, or Firm* — Altis Law Group, Inc.

(57) ABSTRACT

An actuator includes a base, a stationary frame mounted on the base, a moveable frame received in the stationary frame and supported on the base, a shaft mounted on a side surface of the moveable frame, a magnet, a flexible printed circuit, a piezoelectric motor, and a position sensor. The magnet is mounted on the side surface of the moveable frame and apart from the shaft. The flexible printed circuit is mounted on a sidewall of the stationary frame in an unfolded state. The piezoelectric motor is mounted on the flexible printed circuit and matches with the shaft. The position sensor is mounted on the flexible printed circuit and apart from the piezoelectric motor. The position sensor is configured for detecting the location of the magnet.

15 Claims, 5 Drawing Sheets

ACTUATOR AND CAMERA MODULE HAVING SAME

BACKGROUND

1. Technical Field

The present disclosure relates to an actuator and a camera module having the actuator.

2. Description of Related Art

An actuator is preferred for driving lenses along an optical axis in image capturing devices to achieve an auto-focus function of the image capturing device. Many actuators include a stationary frame, electronic components, and a flexible printed circuit (FPC) supporting the electronic components. However, the FPC is attached to the stationary frame in a folded state. This makes the assembly of FPC difficult and damage to FPC often occurs during assembly.

Therefore, it is desirable to provide an actuator and a camera module having the actuator, which can overcome or at least alleviate the above-mentioned problems.

DETAILED DESCRIPTION

Figure 1:
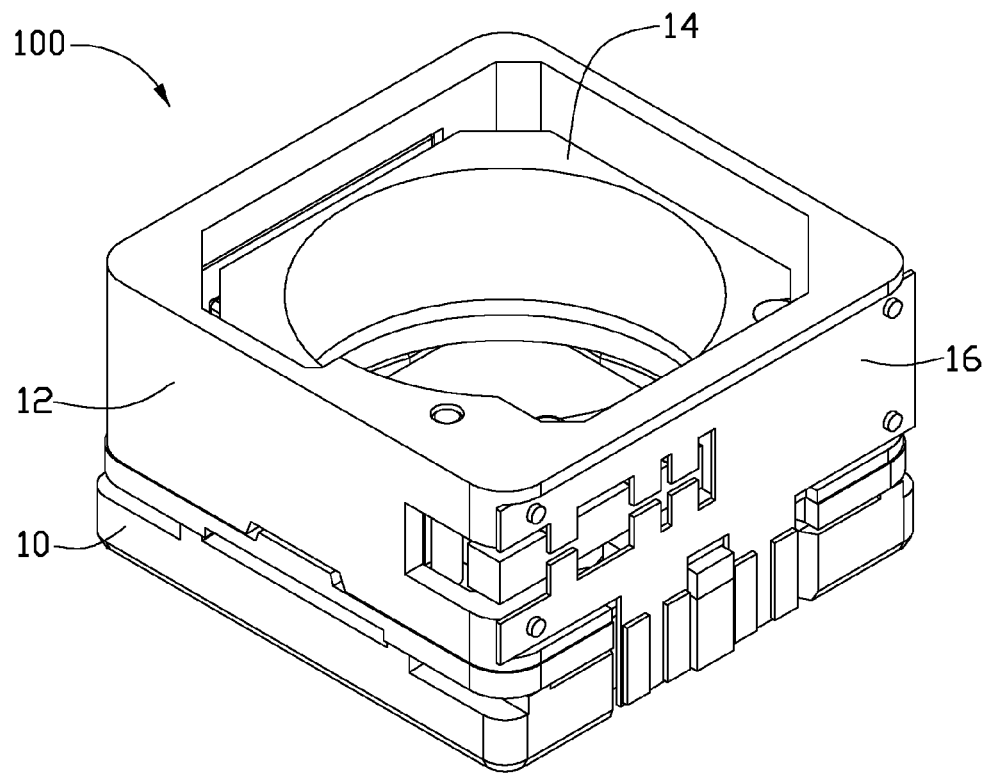
FIG. 1 is a schematic, isometric view of an actuator, according to a first exemplary embodiment.
Figure 2:
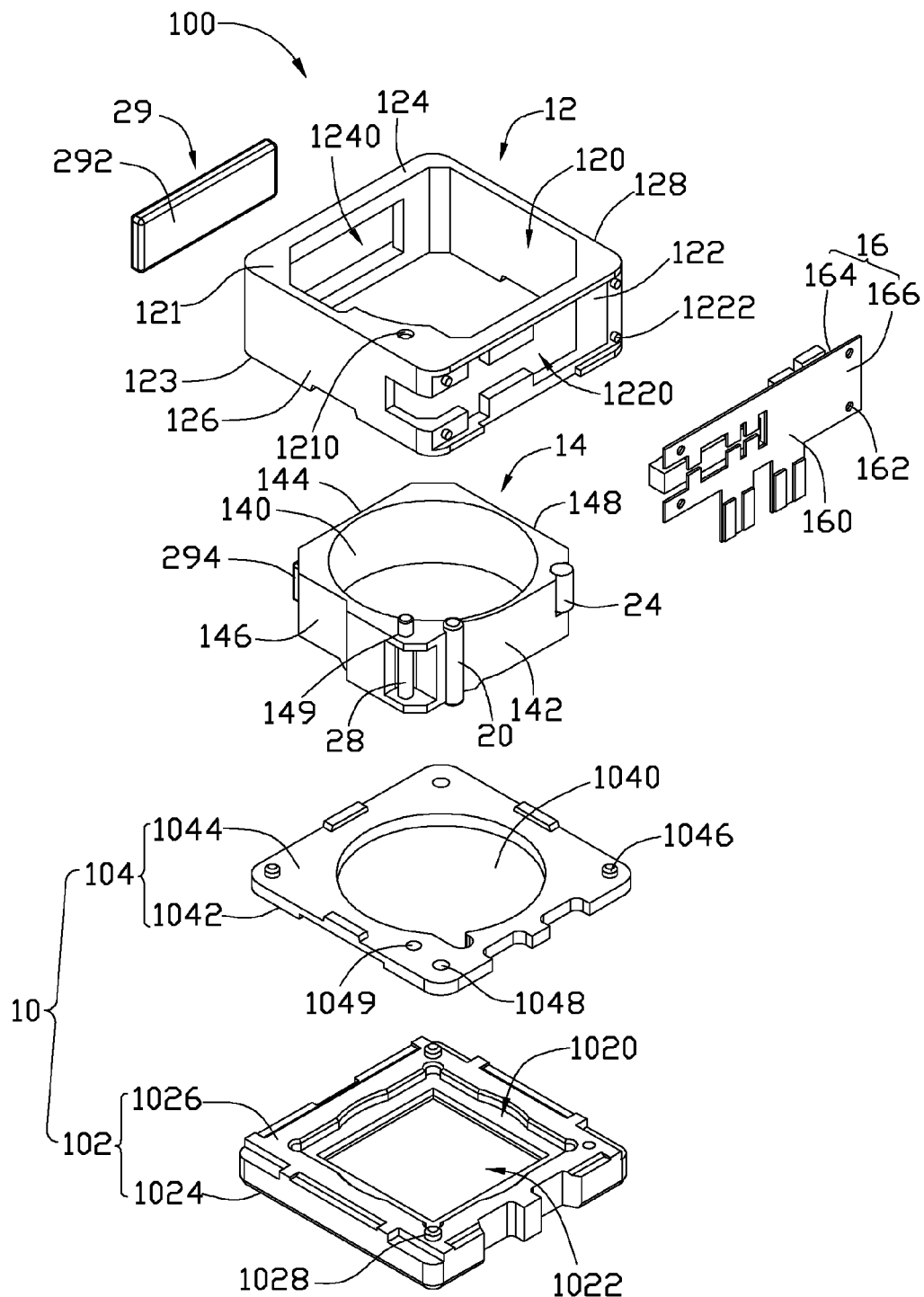
FIG. 2 is an exploded view of the actuator of FIG. 1.
Figure 3:
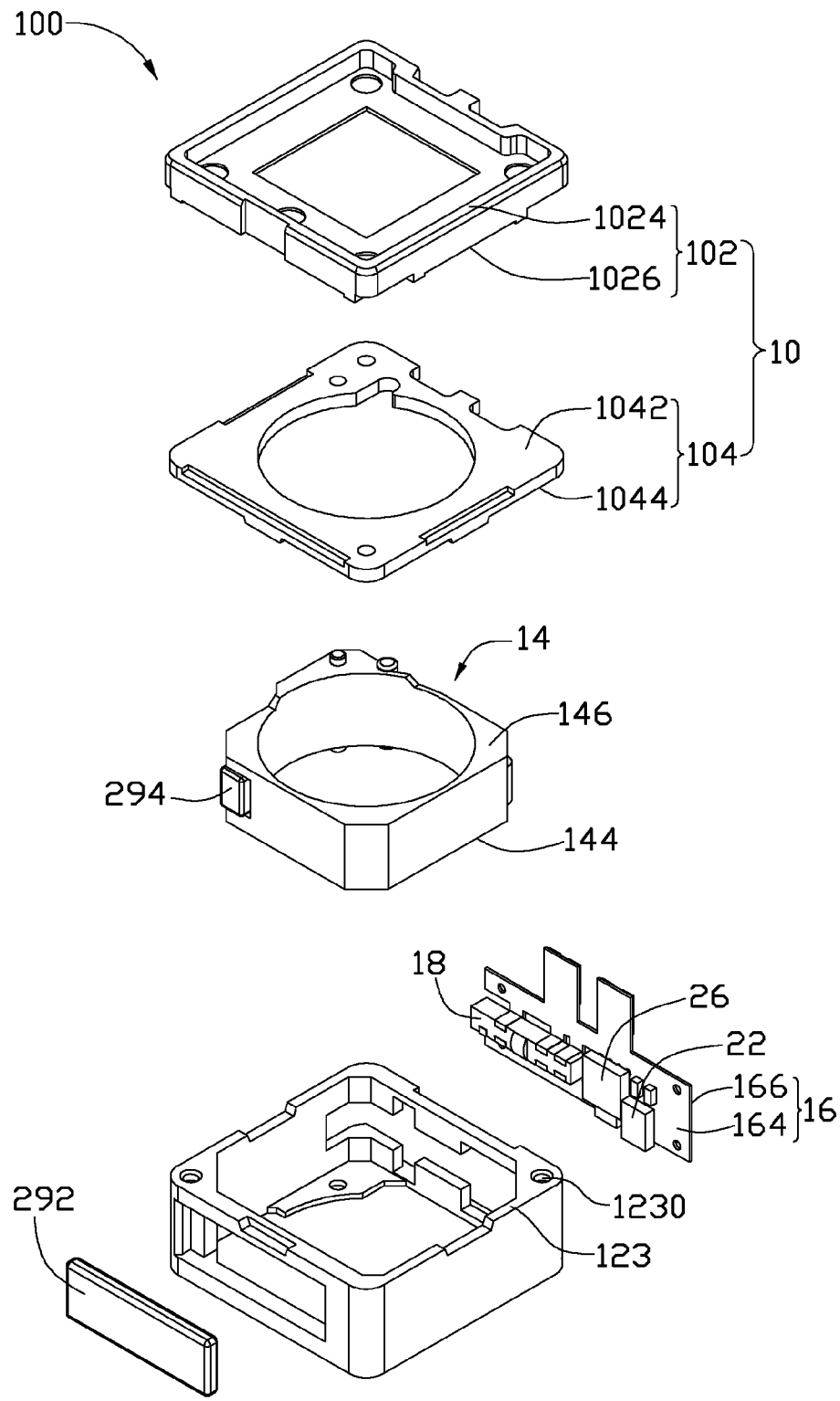
FIG. 3 is similar to FIG. 2, but viewed from another aspect.

Referring to FIGS. 1-3, an actuator 100, according to a first exemplary embodiment, includes a base 10, a stationary frame 12, a moveable frame 14, an FPC 16, a piezoelectric motor 18, a shaft 20, a position sensor 22, a magnet 24, a drive circuit 26, a guide pole 28, and a magnetic assembly 29.

The base 10 includes a main body 102 and a support 104. The support 104 is supported on the main body 102.

The main body 102 is substantially cuboid. The main body 102 defines a receiving groove 1020 and a through hole 1022 in a central portion thereof. The receiving groove 1020 is in communication with the through hole 1022. The main body 102 includes a first body surface 1024 and a second body surface 1026 opposite to the first body surface 1024. Two posts 1028 extend from two opposite corners of the second body surface 1026.

The support 104 defines a light incident hole 1040 in a central portion thereof. The support 104 includes a first support surface 1042 and a second support surface 1044 opposite to the first support surface 1042. Two protrusions 1046 extend from two opposite corners of the second support surface 1044, respectively. Two fixing holes 1048 are defined in another two opposite corners of the second support surface 1044 corresponding to the two posts 1028. A blind hole 1049 is defined in one corner of the second support surface 1044 adjacent to one fixing hole 1048. When the main body 102 supports the support 104, the first support surface 1042 contacts the second body surface 1026. The posts 1028 extend through the respective fixing holes 1048 and are glued in place. The light through hole 1040 is aligned with the receiving groove 1020 and the through hole 1022.

The stationary frame 12 is substantially cuboid and defines a first receiving room 120 for receiving the moveable frame 14. The stationary frame 12 includes a first sidewall 122, a second sidewall 124, a third sidewall 126, and a fourth sidewall 128. The first sidewall 122 is substantially parallel to the second sidewall 124. The third sidewall 126 is substantially parallel to the fourth sidewall 128. The first sidewall 122, the third sidewall 126, the second sidewall 124, and the fourth sidewall 128 connect end-to-end and cooperatively define the first receiving room 120. The first sidewall 122 defines a first receiving hole 1220. The second sidewall 124 defines a second receiving hole 1240. Four engagement portions 1222 extend from four corners of the first sidewall 122 away from the first receiving room 120. The stationary frame 12 includes an upper surface 121 and a lower surface 123 opposite to the upper surface 121. A guide hole 1210 is defined in the upper surface 121. The guide hole 1210 corresponds to the blind hole 1049. Two engagement holes 1230 are defined at two corners of the lower surface 123 corresponding to the protrusions 1046.

Figure 4:
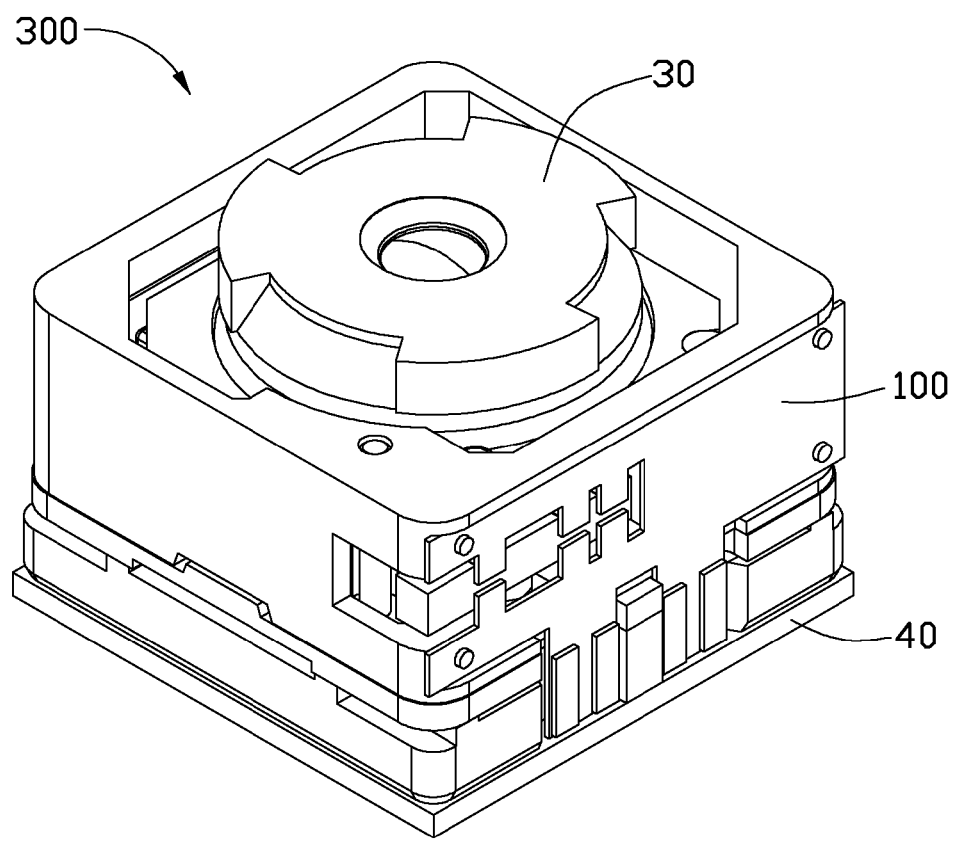
FIG. 4 is a schematic, isometric view of a camera module, according to a second exemplary embodiment.

The moveable frame 14 is substantially cuboid and defines a second receiving room 140 for receiving a lens module 30 (shown in FIG. 4). The moveable frame 14 is received in the first receiving room 120 and supported on the support 104. The moveable frame 14 includes a first side surface 142, a second side surface 144, a third side surface 146, and a fourth side surface 148. The first side surface 142 is substantially parallel to the second side surface 144. The third side surface 146 is substantially parallel to the third side surface 148. The first side surface 142, the third side surface 146, the second side surface 144, and the fourth side surface 148 connect end-to-end to cooperatively define the second receiving room 140. The first side surface 142 faces the first sidewall 122. The second side surface 144 faces the second sidewall 124. The third side surface 146 faces the third sidewall 126. The fourth side surface 148 faces the fourth sidewall 128. A hole 149 through the moveable frame 14 is defined in a corner of the moveable frame 14. The hole 149 corresponds to the guide hole 1210 and the blind hole 1049.

The FPC 16 defines four mounting holes 162 at four corners thereof. The four mounting holes 162 correspond to the four engagement portions 1222. The FPC 16 includes a first surface 164 and a second surface 166 opposite to the first surface 164. The FPC 16 is mounted on the first sidewall 122, and the first surface 164 faces the first receiving room 120.

The piezoelectric motor 18, the position sensor 22, and the drive circuit 26 are mounted on the first surface 164 and spaced from each other. The piezoelectric motor 18 is electrically connected to the drive circuit 26. In this embodiment, the position sensor 22 is a Hall sensor.

The shaft 20 and the magnet 24 are mounted on the first side surface 142 and spaced from each other. The shaft 20 is positioned at an intersection of the first side surface 142 and the third side surface 146. The magnet 24 is positioned at an intersection of the first side surface 142 and the fourth side surface 148. The guide pole 28 perpendicularly extends through the hole 149 and engages in the blind hole 1049. In this embodiment, the shaft 20 and the guide pole 28 are made of stainless steel.

The magnetic assembly 29 includes a first magnet 292 and a second magnet 294. The first magnet 292 is received in the second receiving hole 1240. The second magnet 294 is attached to the second side surface 144 adjacent to the first magnet 292. The magnetic pole of one end of the first magnet 292 adjacent to the second magnet 294 is the same as that of one end of the second magnet 294 adjacent to the first magnet 292.

In assembly, the two posts 1028 extend through the respective fixing holes 1048 and are glued so that the support 104 is mounted on the main body 102. The guide pole 28 perpendicularly extends through the hole 149 and is engaged in the blind hole 1049 so that the moveable frame 14 is supported on the support 104. The shaft 20 and the magnet 24 are mounted on the first side surface 142. The second magnet 294 is mounted on the second side surface 144. The four engagement portions 1222 extend through the respective mounting holes 162 and are glued so that the FPC 16 is mounted on the first sidewall 122. The piezoelectric motor 18, the position sensor 22, and the drive circuit 26 are received in the first receiving hole 1220. The first magnet 292 is mounted in the second receiving hole 1240. The two protrusions 1046 extend through the respective engagement holes 1230 and are glued so that the stationary frame 12 is mounted on the support 104 and receives the moveable frame 14. The piezoelectric motor 18 is aligned with the shaft 20, such that when activated, the motor 18 contacts the shaft 20 and moves it in steps. The position sensor 22 is aligned with the magnet 24. The first magnet 292 faces the second magnet 294 so that the repulsive force between them keeps the frame 14 biased towards the motor 18. The FPC 16 is mounted on the stationary frame 12 in an unfolded state. This makes the assembly of the FPC 16 easy and prevents damage to the FPC 16 that might otherwise be caused by assembly.

When in use, the drive circuit 26 excites the piezoelectric motor 18. The piezoelectric motor 18 drives the shaft 20 in either direction along the optical axis depending on direction of current applied to the motor 18, thus the moveable frame 14 moves along the guide pole 28 in desired direction and a desired amount. The position sensor 22 is configured for detecting the location of the magnet 24 according to Hall Effect so that movement of the moveable frame 14 can be precisely controlled. A repulsive force exists between the first magnet 292 and the second magnet 294 for lateral positioning of the frame 14, thus keeping the proper distance between the piezoelectric motor 18 and the shaft 20.

Figure 5:
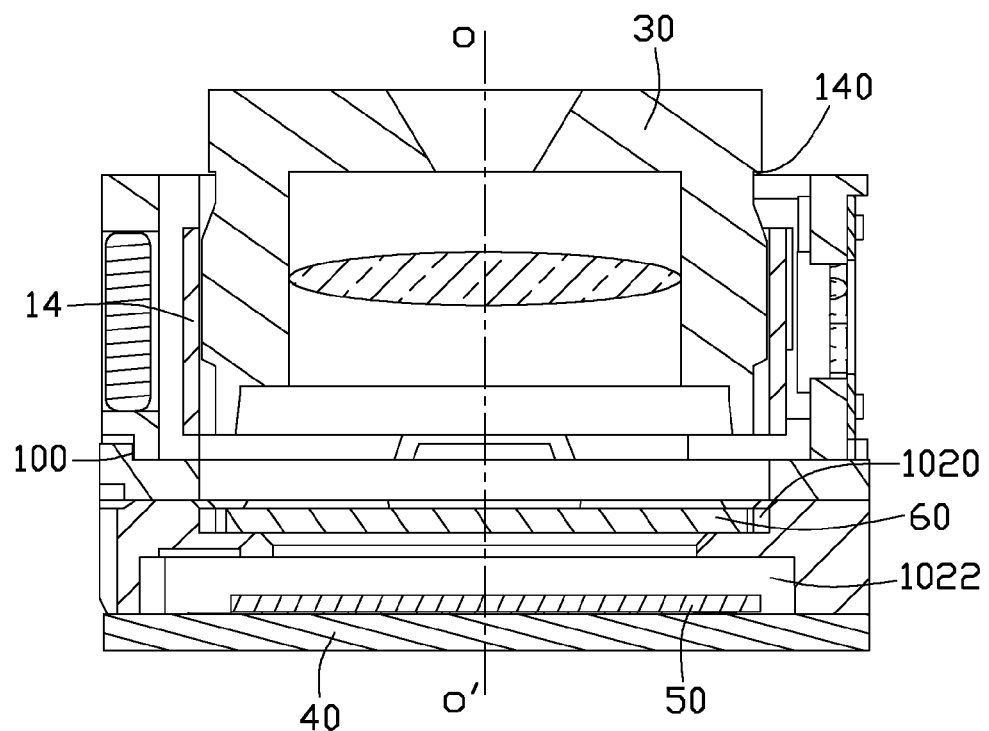
FIG. 5 is a sectional view of the camera module of FIG. 4.

Referring to FIGS. 4-5, a camera module 300, according to second exemplary embodiment, is shown. The camera 300 includes the actuator 100, a lens module 30, a substrate 40, an image sensor 50, and an infrared filter 60. The lens module 30 is received in the second receiving room 140. The actuator 100 is supported on the substrate 40. The image sensor 50 is positioned on the substrate 40 and received in the through hole 1022. The infrared filter 60 is received in the receiving groove 1020. An optical axis OO' of the camera module 300 is aligned with the center of the image sensor 50 and the light incident hole 1040. When the camera module 300 is in use, the moveable member 14 with the lens module 30 moves along the optical axis OO', thereby achieving an auto-focus.

Advantages of the camera module 300 of the second embodiment are similar to those of the actuator 100 of the first embodiment.

It is to be understood, however, that even though numerous characteristics and advantages of the present embodiments have been set fourth in the foregoing description, together with details of the structures and functions of the embodiments, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. An actuator comprising:
   a base;
   a stationary frame mounted on the base and comprising a first sidewall and a second sidewall substantially parallel to the first sidewall;
   a moveable frame received in the stationary frame and supported on the base, the moveable frame comprising a first side surface and a second side surface substantially parallel to the first side surface, the first side surface facing the first sidewall, the second side surface facing the second sidewall;
   a shaft mounted on the first side surface of the moveable frame;
   a magnet mounted on the first side surface of the moveable frame and spaced apart from the shaft;
   a flexible printed circuit mounted on the first sidewall of the stationary frame in an unfolded state;
   a piezoelectric motor mounted on the flexible printed circuit and engaging with the shaft; and
   a position sensor mounted on the flexible printed circuit and spaced apart from the piezoelectric motor, the position sensor configured for detecting the location of the magnet.

2. The actuator as claimed in claim 1, wherein the position sensor is a Hall sensor.

3. The actuator as claimed in claim 1, further comprising a guide pole, wherein the guide pole extends through the moveable frame and is perpendicularly fixed on the base.

4. The actuator as claimed in claim 3, wherein the guide pole and the shaft are made of stainless steel.

5. The actuator as claimed in claim 1, further comprising a magnetic assembly, wherein the magnetic assembly comprises a first magnet and a second magnet, the first magnet is mounted on the second sidewall, and the second magnet is mounted on the second side surface facing the first magnet.

6. The actuator as claimed in claim 5, wherein the first sidewall defines a first receiving hole, the second sidewall defines a second receiving hole, the piezoelectric motor and the position sensor are received in the first receiving hole, and the first magnet is received in the second receiving hole.

7. The actuator as claimed in claim 5, further comprising a drive circuit, wherein the drive circuit is mounted on the flexible print board and received in the first receiving hole, and the drive circuit is electrically connected to the piezoelectric motor.

8. A camera module comprising:
   an actuator comprising:
      a base;
      a stationary frame mounted on the base and comprising a first sidewall and a second sidewall substantially parallel to the first sidewall;
      a moveable frame received in the stationary frame and supported on the base, the moveable frame comprising a first side surface and a second side surface substantially parallel to the first side surface, the first side surface facing the first sidewall, the second side surface facing the second sidewall;
      a shaft mounted on the first side surface of the moveable frame;
      a magnet mounted on the first side surface of the moveable frame and spaced apart from the shaft;
      a flexible printed circuit mounted on the first sidewall of the stationary frame in an unfolded state;
      a piezoelectric motor mounted on the flexible printed circuit and engaging with the shaft; and
      a position sensor mounted on the flexible printed circuit and spaced apart from the piezoelectric motor, the position sensor configured for detecting the location of the magnet;
   a lens module received in the moveable frame;
   a substrate supporting the actuator; and
   an image sensor supported on the substrate and received in the base, an optical axis of the lens module aligned with the center of the image sensor.

9. The camera module as claimed in claim 8, further comprising an infrared filter, wherein the base comprises a main body and a support, the main body defines a receiving groove and a through hole in communication with the receiving groove, the support defines a light incident hole, the support is mounted on the main body, the light incident hole is aligned with the receiving groove and the through hole, the infrared filter is received in the receiving groove, and the image sensor is received in the through hole.

10. The camera module as claimed in claim 8, wherein the position sensor is a Hall sensor.

11. The camera module as claimed in claim 8, further comprising a guide pole, wherein the guide pole extends through the moveable frame and is perpendicularly fixed on the base.

12. The camera module as claimed in claim 11, wherein the guide pole and the shaft are made of stainless steel.

13. The camera module as claimed in claim 8, further comprising a magnetic assembly, wherein the magnetic assembly comprises a first magnet and a second magnet, the first magnet is mounted on the second sidewall, and the second magnet is mounted on the second side surface facing the first magnet.

14. The camera module as claimed in claim 13, wherein the first sidewall defines a first receiving hole, the second sidewall defines a second receiving hole, the piezoelectric motor and the position sensor are received in the first receiving hole, and the first magnet is received in the second receiving hole.

15. The camera module as claimed in claim 14, further comprising a drive circuit, wherein the drive circuit is mounted on the flexible print board and received in the first receiving hole, and the drive circuit is electrically connected to the piezoelectric motor.

* * * * *